US008214628B2

(12) United States Patent  (10) Patent No.: US 8,214,628 B2
Hirai et al.  (45) Date of Patent: Jul. 3, 2012

(54) COMPUTER PERFORMANCE MONITORING BY ASSOCIATING COUNTER VALUES WITH PARTICULAR PROCESSES WHEN AN INTERRUPT IS DETECTED

(75) Inventors: Akira Hirai, Kawasaki (JP); Kouichi Kumon, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 370 days.

(21) Appl. No.: 12/398,850

(22) Filed: Mar. 5, 2009

(65) Prior Publication Data

US 2009/0235056 A1  Sep. 17, 2009

(30) Foreign Application Priority Data

Mar. 14, 2008 (JP) ................. 2008-065077

(51) Int. Cl.
*G06F 9/00* (2006.01)
(52) U.S. Cl. ........................ 712/244; 710/260
(58) Field of Classification Search .......... 710/260; 712/244
See application file for complete search history.

(56) References Cited

U.S. PATENT DOCUMENTS

| | | | | |
|---|---|---|---|---|
| 5,003,462 A * | 3/1991 | Blaner et al. | | 711/207 |
| 5,164,969 A * | 11/1992 | Alley et al. | | 377/39 |
| 5,796,939 A * | 8/1998 | Berc et al. | | 714/47.3 |
| 6,038,661 A * | 3/2000 | Yoshioka et al. | | 712/244 |
| 2002/0002669 A1* | 1/2002 | Yoshioka et al. | | 712/244 |
| 2002/0069328 A1* | 6/2002 | Chauvel | | 711/130 |
| 2003/0023932 A1* | 1/2003 | Arndt et al. | | 714/805 |
| 2004/0073768 A1* | 4/2004 | Bottemiller et al. | | 711/207 |
| 2005/0010908 A1* | 1/2005 | Funk et al. | | 717/124 |
| 2005/0027914 A1* | 2/2005 | Hammalund et al. | | 710/260 |
| 2005/0144347 A1* | 6/2005 | Kitamura et al. | | 710/260 |
| 2005/0154811 A1* | 7/2005 | DeWitt et al. | | 710/260 |
| 2005/0154812 A1* | 7/2005 | DeWitt et al. | | 710/260 |
| 2007/0044106 A2* | 2/2007 | Kissell | | 718/108 |
| 2008/0320290 A1* | 12/2008 | Moyer | | 712/244 |
| 2009/0070570 A1* | 3/2009 | Choudhury et al. | | 712/244 |

FOREIGN PATENT DOCUMENTS

JP  A 10-260869  9/1998

* cited by examiner

*Primary Examiner* — Idriss N Alrobaye
(74) *Attorney, Agent, or Firm* — Greer, Burns & Crain, Ltd.

(57) ABSTRACT

A performance monitoring device has an interrupt detection unit that detects generation of an interrupt process to be executed by a processor in accordance with TLB entry invalidation executed in an operating system. A counter value acquisition unit acquires a counter value of a predetermined event counted by the processor when the interrupt process is detected by the interrupt detection unit. A process information acquisition unit acquires identification information for identifying a process executed on the processor from the operating system immediately before the interrupt process is detected by the interrupt detection unit. An associating unit associates the counter value acquired by the counter value acquisition unit during the interrupt process with the identification information acquired by the process information acquisition unit immediately before the interrupt process.

12 Claims, 8 Drawing Sheets

| CPU NUMBER | 0 | 1 | 2 | 3 | n |
|---|---|---|---|---|---|
| PID | 1000 | 1002 | 1003 | 1001 | nnnn |

FIG. 8

| PID | COUNTER NUMBER | | | | |
|---|---|---|---|---|---|
| | 0 | 1 | 2 | 3 | n |
| 1000 | 102 | 300 | 214 | 458 | nnn |
| 1001 | 301 | 58 | 129 | 823 | nnn |
| 1002 | 403 | 149 | 281 | 569 | nnn |
| 1003 | 289 | 231 | 198 | 782 | nnn |
| nnnn | nnn | nnn | nnn | nnn | nnn |

FIG. 9

```
< eventsetid="1">
   <counter= "0" register_value= "0x1f3c0079" event_name= "clock" />
   <counter= "1" register_value= "0x1f5c0081" event_name= "instruction" />
   <counter= "2" register_value= "0x1f7c0028" event_name= "L1 miss" />
   <counter= "3" register_value= "0x1f9c0055" event_name= "L2 miss" />
</ eventset>

< eventsetid="2">
   <counter= "0" register_value= "0x1f3c0011" event_name= "branch" />
   <counter= "1" register_value= "0x1f5c0048" event_name= "DTLB miss" />
   <counter= "2" register_value= "0x1f7c0072" event_name= "ITLB miss" />
   <counter= "3" register_value= "0x1f9c0091" event_name= "memory access" />
</ eventset>
          .
          .
          .
```

FIG. 10

DEFINITION FILE NAME  eventdefid = 1

| PID | COUNTER 0 clock | COUNTER 1 instruction | COUNTER 2 L1 miss | COUNTER 3 L2 miss |
|---|---|---|---|---|
| 1000 | 15489 | 14565 | 2898 | 579 |
| 1001 | 29087 | 19736 | 1843 | 237 |
| 1002 | 19322 | 8134 | 932 | 90 |
| ⋮ | ⋮ | ⋮ | ⋮ | ⋮ |

COMPUTER PERFORMANCE MONITORING BY ASSOCIATING COUNTER VALUES WITH PARTICULAR PROCESSES WHEN AN INTERRUPT IS DETECTED

CROSS-REFERENCE TO RELATED APPLICATIONS

This application is related to and claims priority to Japanese patent application No. 2008-65077 filed on Mar. 14, 2008 in the Japan Patent Office, and incorporated by reference herein.

BACKGROUND

1. Field

The embodiments discussed herein are directed to a technology for accurately and efficiently monitoring operation information of each program (process) executed in a CPU that has a paging system virtual memory.

2. Description of the Related Art

In recent years, many processors have a performance monitoring counter. Performance monitoring counters count events inside the processor, such as the number of clocks, the number of execution instructions, and the number of cache misses, and events of exchanges with the outside. In addition, these performance monitoring counters each have a plurality of counters and are able to selectively count a desired event from among a plurality of types of events.

Furthermore, the performance monitoring counters generate an interrupt in a specific or specified vector when a specified event is detected, and are able to collect accompanying information when the event occurs.

A known method of collecting or analyzing operation information of a program uses a performance monitoring counter of a CPU. This is, for example, described in Japanese Laid-open Patent Publication No. H10-260869.

The most typical performance analyzing method that uses the performance monitoring counter reads counter values at the time when a program starts and ends and then calculates the difference between the counter values to thereby quantitatively analyze characteristics, such as the number of clocks and the number of instructions needed for executing the target program.

In addition, another known method reads the performance monitoring counter at constant intervals to analyze the operating status and operating characteristics of an entire system.

An unwanted feature of the above methods is that, under the condition that a plurality of programs are executed, it is difficult to accurately associate values, read by the performance monitoring counter, with the respective programs. In order to collect counter values for respective programs, it is necessary to collect and accumulate a counter value for each program when an operating system switches a task.

In the above related arts, actually, there is no choice but, irrespective of whether it is inaccurate, to read counter values from the performance monitoring counter at the time when a program starts and ends or the OS is modified so as to switch counter values at the time of task switching.

The invention addresses the above described problem, and it is an object of the invention to provide a technology for accurately and efficiently monitoring operation information of each program (process) executed in a CPU that has a paging system virtual memory without any special modification at the side of an operating system.

SUMMARY

A performance monitoring device has an interrupt detection unit that detects generation of an interrupt process to be executed by a processor in accordance with TLB (Translation Lookaside Buffer) entry invalidation executed in an operating system. The device has a counter value acquisition unit that acquires a counter value of a predetermined event counted by the processor at a timing at which the interrupt process is detected by the interrupt detection unit. The device has a process information acquisition unit that acquires identification information for identifying a process executed on the processor from the operating system immediately before the interrupt process is detected by the interrupt detection unit. The device has an associating unit that associates the counter value acquired at the time of the interrupt process by the counter value acquisition unit with the identification information acquired by the process information acquisition unit immediately before the interrupt process.

BRIEF DESCRIPTION OF THE DRAWINGS

Embodiments are illustrated by way of example and not limited by the following figures.

DESCRIPTION OF THE EMBODIMENTS

Figure 1:
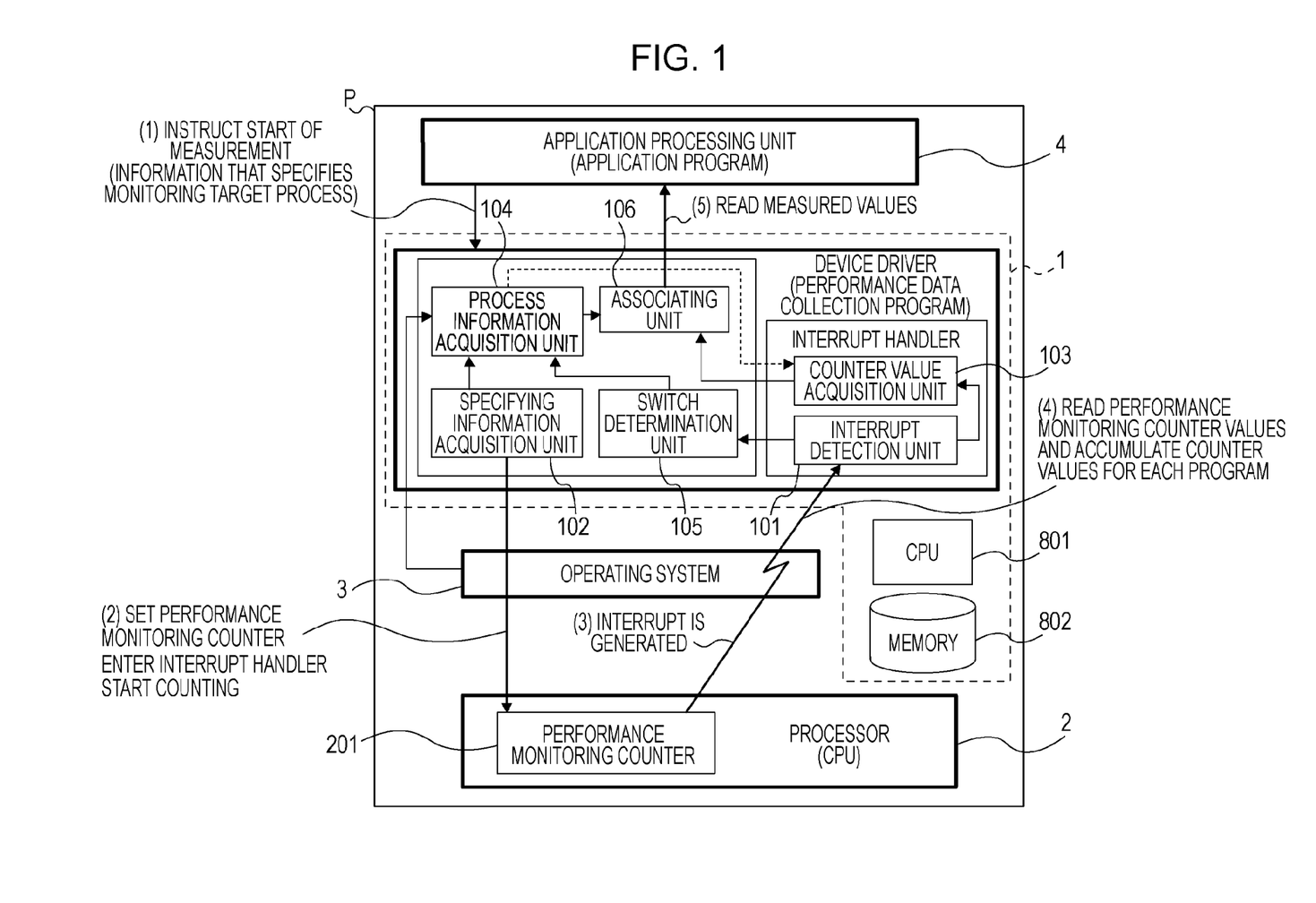
FIG. 1 is a functional block diagram that shows a terminal apparatus equipped with a performance monitoring device according to an embodiment of the invention.

FIG. 1 is a functional block diagram that shows a terminal apparatus P equipped with a performance monitoring device 1 according to an embodiment of a technology disclosed.

As shown in FIG. 1, the terminal apparatus P according to the present embodiment is, for example, a personal computer, a server, or the like, and includes a performance monitoring device 1, a processor 2, an operating system 3 and an application processing unit 4.

Here, the processor 2 includes a performance monitoring counter 201. The performance monitoring counter 201 has a function of counting events inside the processor 2 and events of exchanges with the outside as a unit for performance analysis and optimization in a computer system.

The performance monitoring counter 201 has a function of counting events inside the processor, such as "number of clocks", "number of execution instructions", "number of cache misses" and "TLB entry invalidation event" and events of exchanges with the outside. In addition, the performance monitoring counter 201 has a plurality of counters that are able to count a plurality of parameters, and is able to selectively count a desired event from among a plurality of types of events. Furthermore, the performance monitoring counter 201 has a function of generating an interrupt in a specific or specified vector when a specified event is detected, and is able to collect accompanying information when the event occurs.

Specifically, processors having the function of the above described performance monitoring counter are, for example, Xeon (trademark) processor produced by Intel (trademark) Corp., Opteron (trademark) processor produced by AMD (trademark), Inc., PowerPC (trademark) processor produced by IBM (trademark) Corp.

The performance monitoring device 1 according to the present embodiment includes an interrupt detection unit 101, a specifying information acquisition unit 102, a counter value acquisition unit 103, a process information acquisition unit 104, a switch determination unit 105, an associating unit 106, a CPU 801 and a memory 802.

Hereinafter, the functions of components of the performance monitoring device 1 according to the present embodiment will be described in detail.

The interrupt detection unit 101 detects generation of an interrupt process to be executed by the processor 2 in accordance with a so-called "TLB entry invalidation" (also called "TLB entry flush") executed in an operating system.

The specifying information acquisition unit 102 acquires specifying information (process ID, etc.) for specifying a monitoring target process of the performance monitoring device 1 from the application processing unit 4.

The counter value acquisition unit 103 acquires a counter value of a predetermined event (for example, "number of clocks", "number of execution instructions", "number of cache misses", etc.) counted by the processor 2 at a timing at which the interrupt detection unit 101 detects an interrupt process. Specifically, the counter value acquisition unit 103 starts measurement at the time when a process starts and ends the measurement at the time when the process ends, and then records the number of events that have occurred during that period of time. Here, the predetermined event may be an event that the user arbitrarily selects from among the above described various types of events or may be some predetermined events (see FIG. 9, and the like, which will be described later).

In addition, when specifying information is acquired by the specifying information acquisition unit 102, the counter value acquisition unit 103 is able to acquire the counter value of a predetermined event, which is counted only for the process corresponding to the specifying information acquired by the specifying information acquisition unit 102 on the basis of identification information acquired by the process information acquisition unit 104.

In addition, the counter value acquisition unit 103 is able to start and end the measurement at a selected timing, and is also able to acquire the number of events that have occurred in each process that is operated during that period of time at constant intervals.

The process information acquisition unit 104 acquires the identification information (process ID, etc.) for identifying a process executed on the processor 2 immediately before the interrupt detection unit 101 detects an interrupt process from the operating system 3.

The switch determination unit 105 determines whether the process ID of a process corresponding to information acquired by the process information acquisition unit 104 is different between before and after an interrupt process detected by the interrupt detection unit 101.

When the switch determination unit 105 determines that the process is different between before and after the interrupt process, the process information acquisition unit acquires information (for example, process ID, process name, and other than these, information that can be acquired from the operating system 3 in association with the process, etc.) in association with the process executed immediately after the interrupt process.

The associating unit 106 associates a counter value acquired by the counter value acquisition unit 103 at the time of an interrupt process with information (process ID, etc.) acquired by the process information acquisition unit immediately before the interrupt process.

The CPU 801 executes various processes in the performance monitoring device 1, and also implements various functions by executing programs stored in the memory 802. The memory 802 is formed of, for example, a ROM, a RAM, and the like, and stores various information and programs utilized in the performance monitoring device 1. Note that in the present embodiment, an example in which various programs stored in the memory 802 are executed on the CPU 801 to implement the functions of the performance monitoring device 1 is described, however, it is not limited to this embodiment. Of course, for example, programs may be stored in a memory that is normally provided for the terminal apparatus P and then the programs may be executed by the processor 2 of the terminal apparatus P.

The performance monitoring device 1 is implemented in the terminal apparatus P as a device driver (performance data collection program). The performance data collection program is called from a selected application program (application processing unit 4) and then executed to thereby set the performance monitoring counter 201, instruct start of measurement, and read a counter value accumulated for each program.

Figure 2:
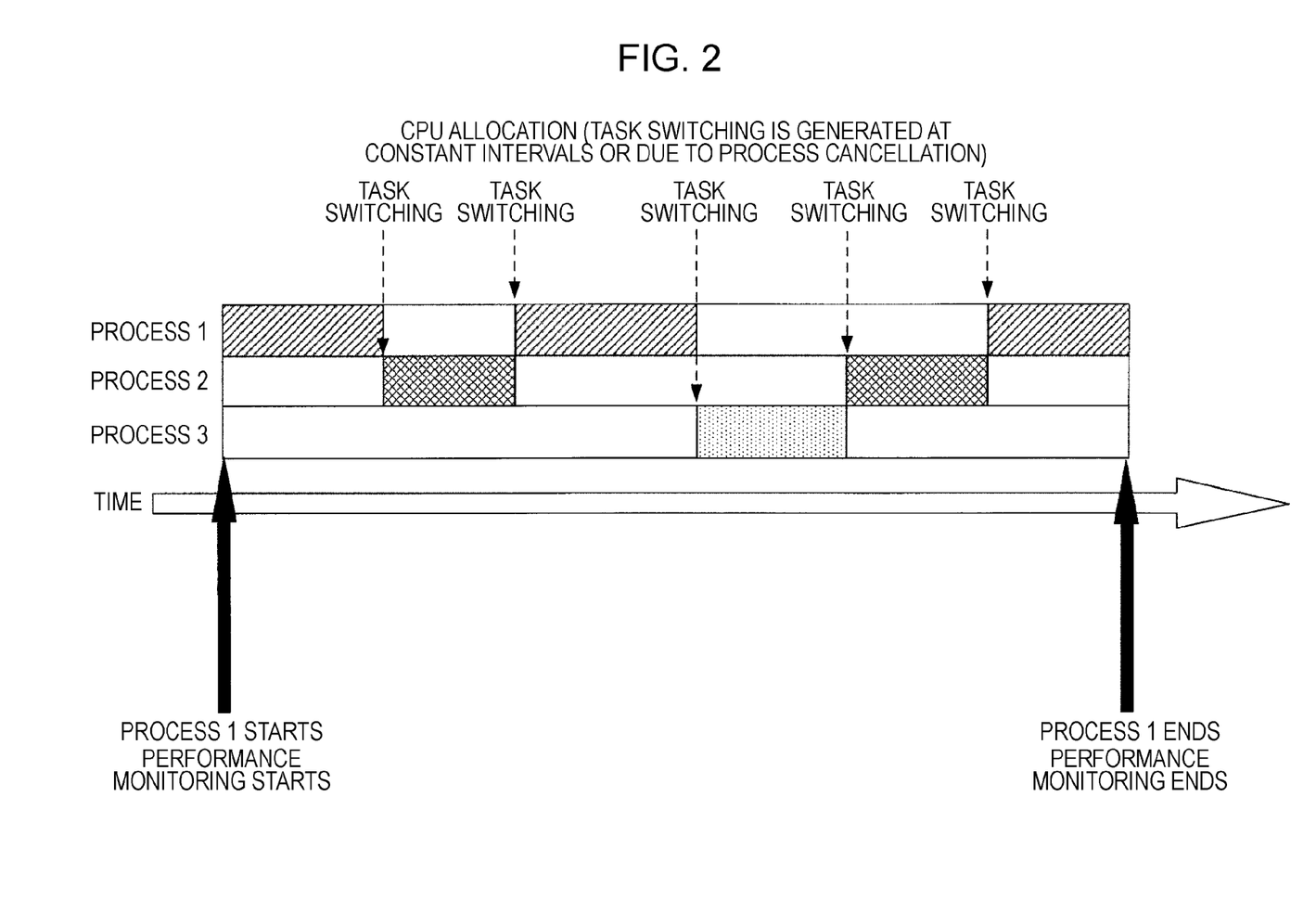
FIG. 2 is a view that illustrates generation of task switching.

The detail of the process in the performance monitoring device 1 according to the present embodiment will now be described. Note that, it is assumed that the performance monitoring counter 201 in the processor 2 sets a TLB entry invalidation event as a count target event, and is configured to execute an interrupt process each time the TLB entry invalidation event occurs. The TLB entry invalidation event is included in the count target events because the TLB entry invalidation event definitely occurs when task switching is generated in the operating system. FIG. 2 is a view that illustrates generation of task switching.

Normally, the operating system 3 executes task switching in the following procedure.

When the operating system 3 generates task switching, the operating system 3 changes CPU setting values, such as register values, and unique information of the currently executed program in the operating system 3 into values for a program that will be subsequently executed.

Figure 3:
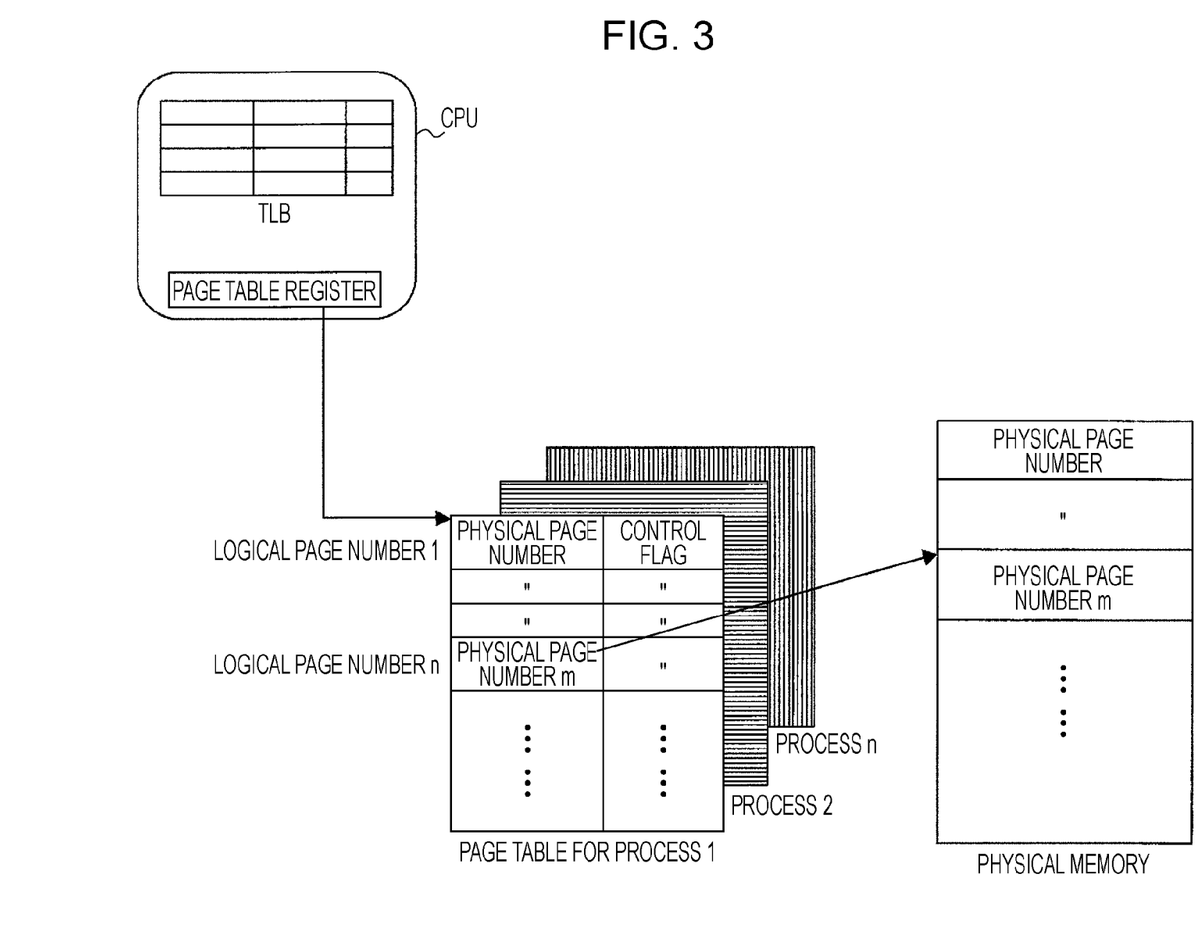
FIG. 3 is a view that illustrates a CPU having a paging system virtual memory.

In the operating system 3 for the CPU having the paging system virtual memory, as shown in FIG. 3, a table (page table) for converting between a virtual address and a physical address for each program is held in the memory, and a register (page table register) that points to the address of the page table is switched at the time of task switching.

Furthermore, the operating system 3 invalidates an entry of a TLB (TRANSLATION LOOKASIDE BUFFERS), which is a cache in the CPU for the page table.

The application program executes "(1) instructing start of measurement" on the performance data collection program at the time when performance monitoring is started. At this time, information that specifies a performance monitoring target process is also transmitted to the performance monitoring device 1 together with the measurement start instruction, where appropriate.

The performance data collection program executes "(2) setting the performance monitoring counter, and enter an interrupt handler" through the operating system 3, and starts counting a counter value of a desired event by the performance monitoring counter 201.

In the processor 2, an interrupt process is generated (which corresponds to "(3) interrupt is generated") each time task switching is generated at the side of the operating system 3, and an interrupt handler formed of the interrupt detection unit 101 and the counter value acquisition unit 103 is called.

Figure 4:
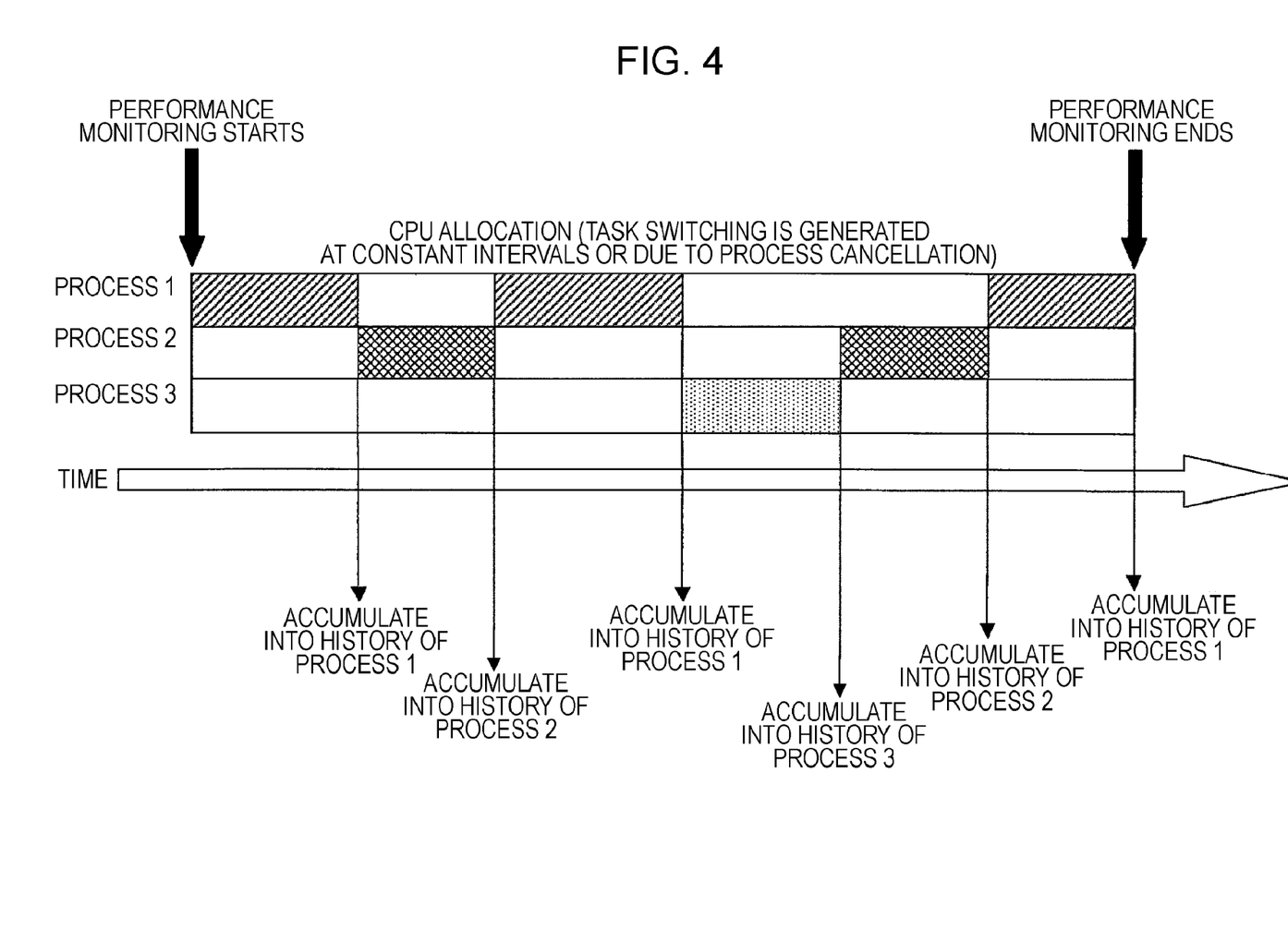
FIG. 4 is a view that illustrates accumulation of counter values by a performance monitoring counter for each process.

The counter value acquisition unit 103 of the interrupt handler executes "(4) reading a performance monitoring counter value" and accumulates the counter value for each operation program (process). FIG. 4 is a view that illustrates accumulation of counter values by the performance monitoring counter for each process.

When the performance monitoring device 1 completes accumulation of the counter values, the accumulated results are transmitted to the application program ("(5) read measured values").

Figure 5:
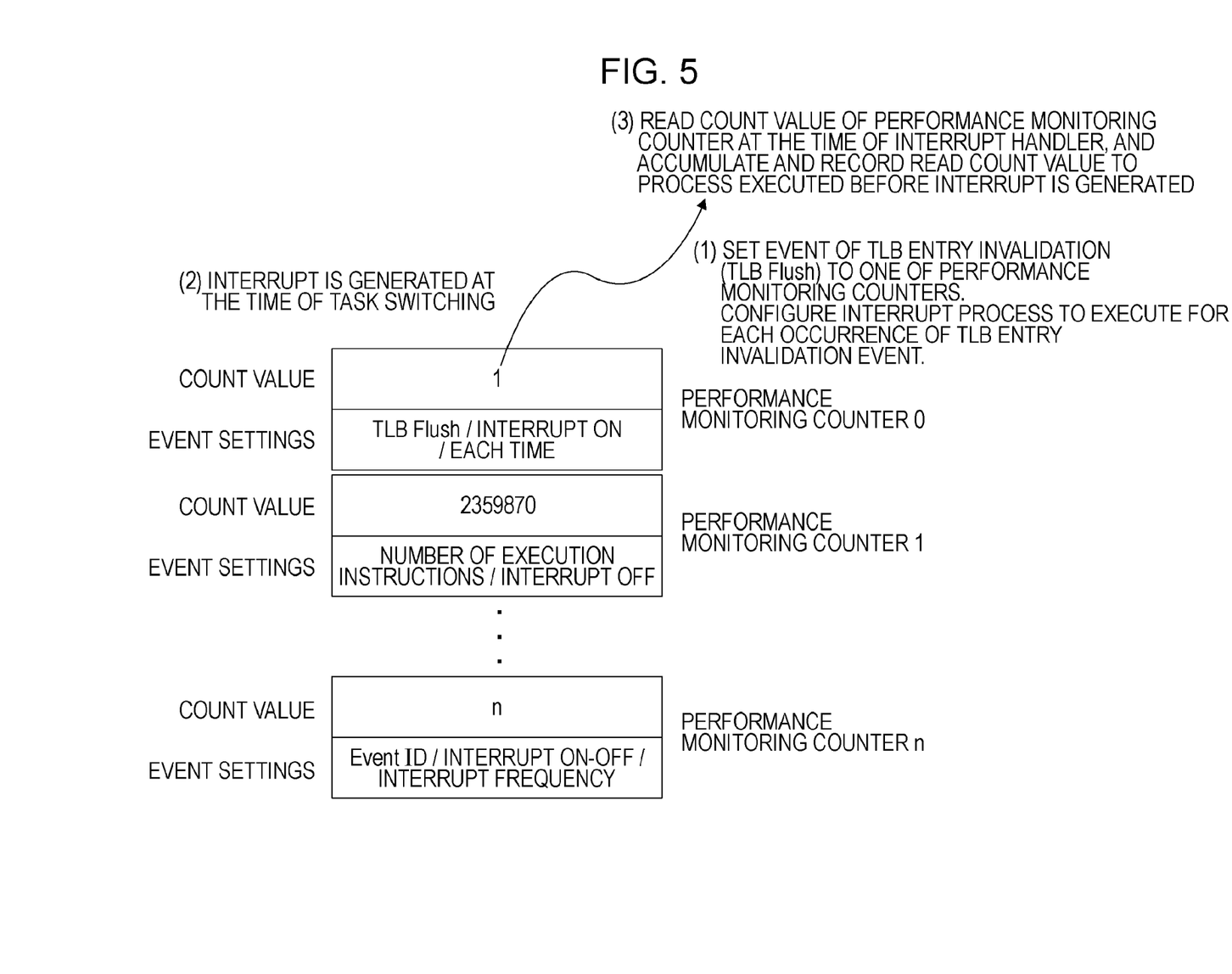
FIG. 5 is a view that illustrates the detail of a method of measuring a counter value for each program using the performance monitoring counter according to the present embodiment.
Figure 6:
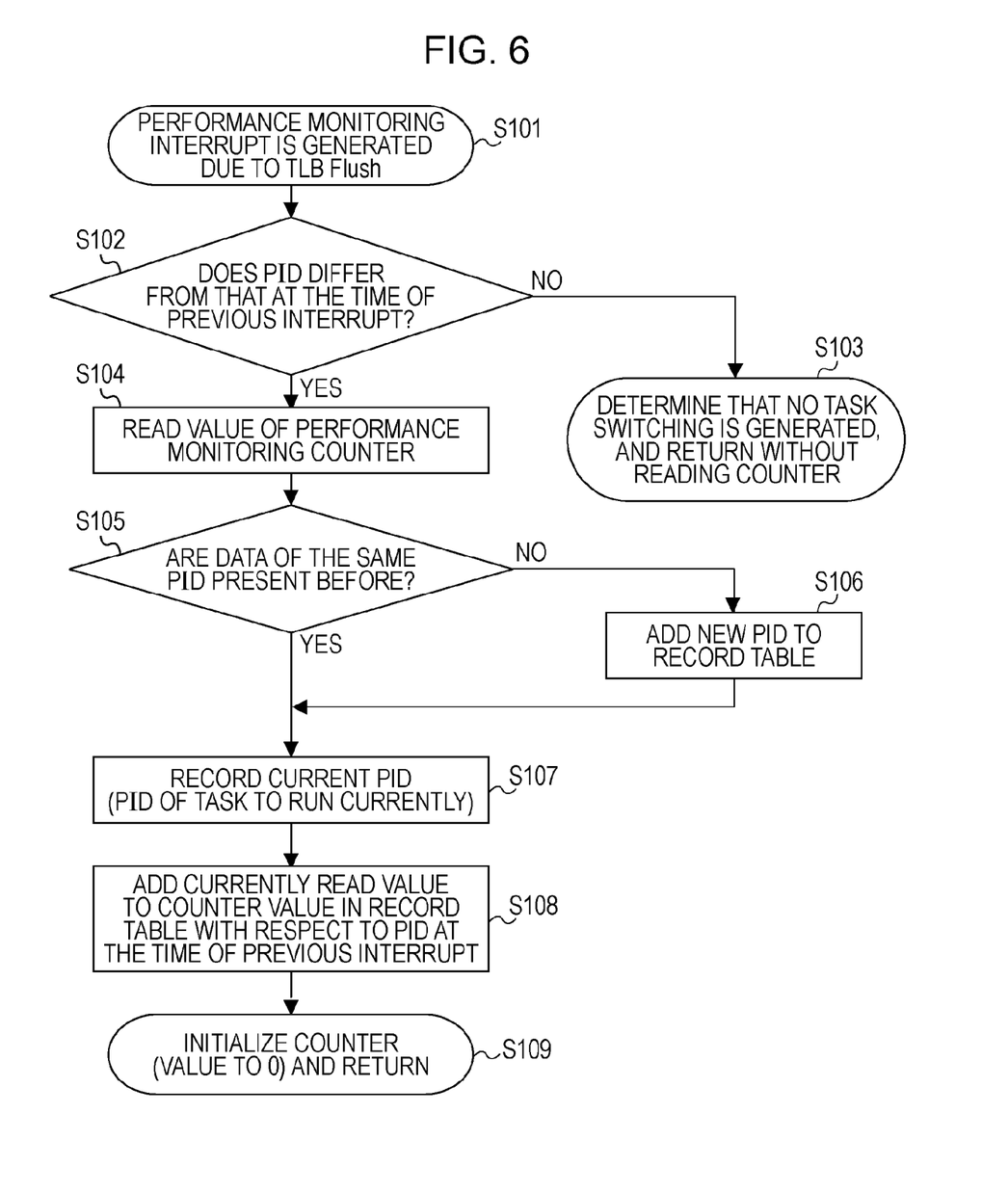
FIG. 6 is a flowchart that shows the process flow of the method of measuring a counter value for each program using the performance monitoring counter according to the present embodiment.

FIG. 5 is a view that illustrates the detail of a method of measuring a counter value for each program using the performance monitoring counter according to the present embodiment. FIG. 6 is a flowchart that shows the process flow of the method of measuring a counter value for each program using the performance monitoring counter according to the present embodiment.

First, as shown in the drawings, the performance monitoring counter 201 is set to count "TLB entry invalidation event" as one of a plurality of count target events through, for example, the application processing unit 4.

In addition, as described above, the performance monitoring counter 201 is configured to generate an interrupt each time a "TLB entry invalidation event" occurs. Note that other events that can be counted by the performance monitoring counter 201 are events such as "the number of execution clocks", "the number of execution instructions" and "the number of cache misses".

When an interrupt process is generated in the processor 2 (S101), the interrupt is detected by the interrupt detection unit 101, and the counter value acquisition unit of the interrupt handler reads a measuring target counter value. An interrupt is generated immediately after a task is switched in the operating system. Thus, the counter value acquired by the counter value acquisition unit 103 is accumulated and recorded as the performance information of the process that has been operated immediately before the task is switched.

Figure 7:
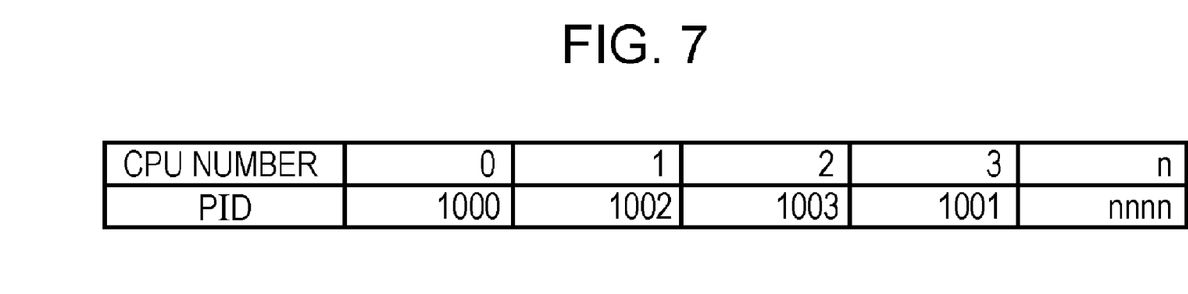
FIG. 7 is a view that shows an example of an interrupt PID storage table that stores a process ID acquired by a process information acquisition unit at the time of an interrupt process.

Incidentally, the TLB entry invalidation event may occur at times other than task switching. However, when the process ID (PID) is changed, it is allowed to definitely determine that task switching is generated. Then, the process information acquisition unit 104 acquires process information. The switch determination unit 105 determines that no task switching is generated when the process at the time of the previous interrupt is the same as the process at the time of the current interrupt (S102, No), and returns from the interrupt without accumulation and recording (S103) FIG. 7 is a view that shows an example of an interrupt PID storage table 104 that stores a process ID acquired by the process information acquisition unit 104 at the time of an interrupt process.

On the other hand, when the process at the time of the previous interrupt differs from the process at the time of the current interrupt (S102, Yes), the switch determination unit 105 determines that task switching is generated. The counter value acquisition unit 103 acquires a desired counter value from the performance monitoring counter 201 and records the acquired counter value in, for example, the memory 802.

Here, when there is the counter value that has been already associated with the same process ID (PID) before (S105, Yes), the process ID of the task that will be currently executed is recorded in, for example, the memory 802.

On the other hand, when there is no counter value that is associated with the same process ID (PID) (S105, No), the process ID is newly added to a record table that is stored in, for example, the memory 802 (S106).

Figure 8:
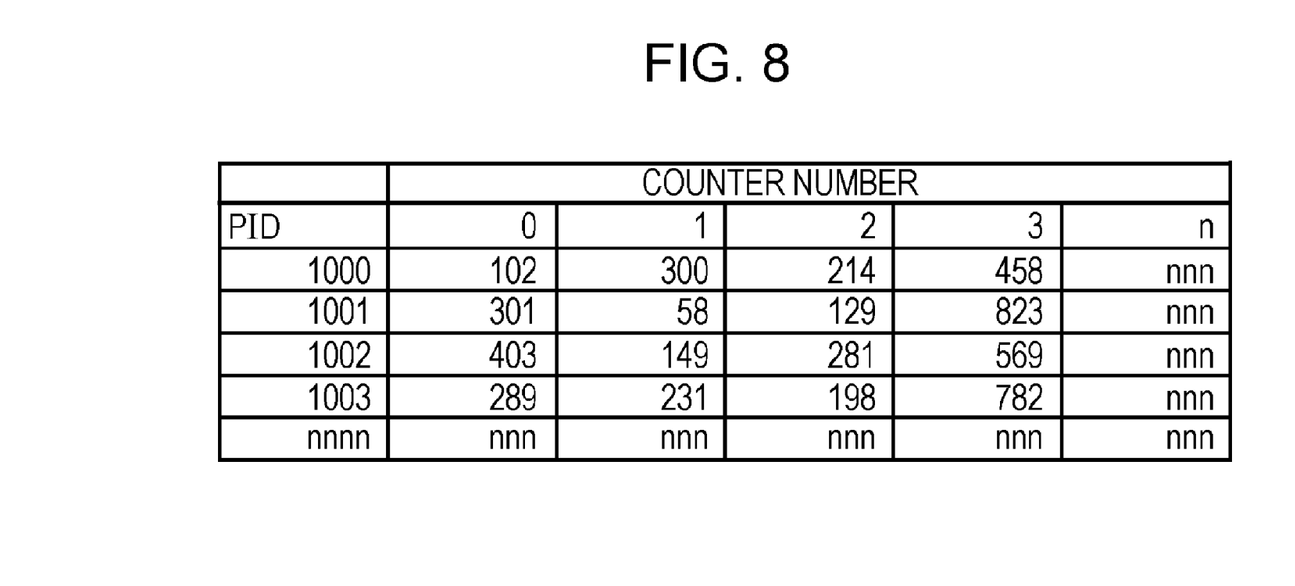
FIG. 8 is a view that shows an example of a performance monitoring counter value record table that is associated by an associating unit and stored in a memory.

Next, the associating unit 106 adds the currently acquired counter value to the counter value in the record table corresponding to the process ID acquired by the process information acquisition unit 104 at the time when the previous interrupt process is generated (S107). In this way, the associating unit 106 associates a counter value acquired at the time of an interrupt process in the counter value acquisition step with identification information acquired in the process information acquisition step in regard to a process that has been executed in the processor 2 immediately before the interrupt process. The data associated by the associating unit 106 are, for example, stored in the memory 802 as a data table. FIG. 8 is a view that shows an example of a performance monitoring counter value record table that is associated by the associating unit 106 and stored in the memory 802.

Finally, the counter value for the TLB entry invalidation event in the performance monitoring counter 201 is initialized and then returned (S108).

Note that in the example shown in FIG. 6, counter values corresponding to a plurality of mutually different process IDs are respectively accumulated, however, it is not limited to this example. It is applicable whenever a process coincides with a measuring target process specified on the basis of specifying information acquired by the specifying information acquisition unit 102 and, only when the process coincides with the measuring target process, the counter value is accumulated. By so doing, it is possible to efficiently recognize the occurrence of an event in the processor at the time when a specified program (process) is executed, and it is also possible to contribute to effective usage of resources because unnecessary counter values are not acquired.

Figure 9:
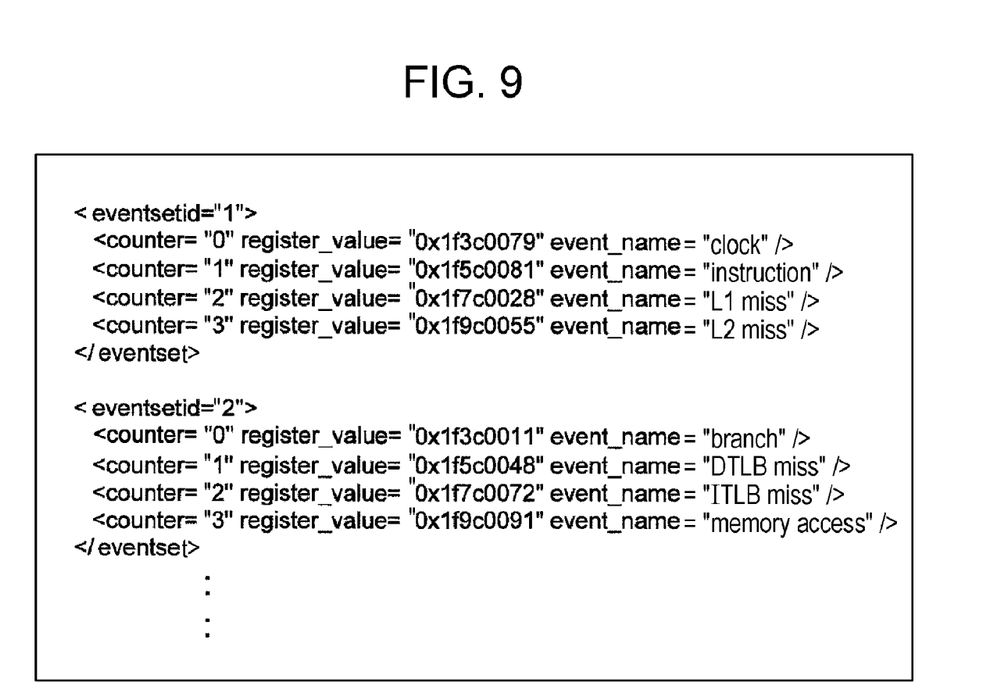
FIG. 9 is a view that shows an example of setting information in regard to the type, and the like, of a monitoring target event in the performance monitoring counter.

FIG. 9 is a view that shows an example of setting information in regard to the type, and the like, of a monitoring target event in the performance monitoring counter 201. The setting information may be specified by the user through an operational input device, such as a keyboard and a mouse, provided for the terminal apparatus P or may be set to a predetermined value. The setting information is held in, for example, the memory 802, or the like, as a data file.

Figure 10:
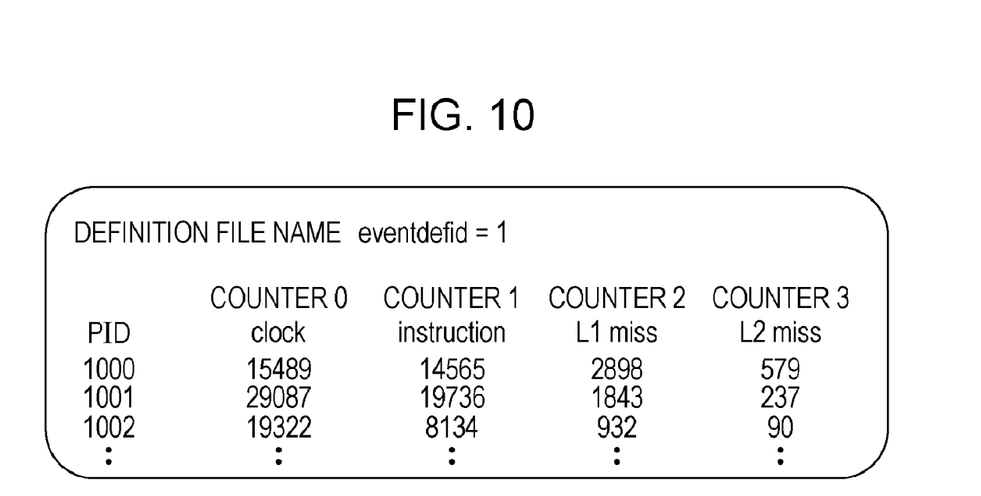
FIG. 10 is a view that shows an example of screen display in list form of process IDs and counter values that are associated by the associating unit.

FIG. 10 is a view that shows an example of screen display in list form of process IDs and counter values that are associated by the associating unit 106 on a display provided for the terminal apparatus P. As shown in the drawing, it appears that the number of occurrences of each event set as a monitoring target is counted for each process ID.

In the existing art, when performance information of a program executed on the operating system is accumulated, it is necessary to additionally provide the operating system with the function of reading a counter value counted by the performance monitoring counter in the processor and accumulating the read counter value as performance information for each program immediately before or after a task switching process is executed on the operating system.

In contrast, in the present embodiment, when "TLB entry invalidation", which occurs when task switching is executed on the operating system 3, is detected by the performance monitoring counter 201 in the processor 2, an interrupt is generated at the timing at which the TLB entry invalidation is executed, and then switching of a counter value for each program is executed as an interrupt process. By so doing, without any special modification to the operating system 3, it is possible to accurately collect performance information of each program executed on the operating system 3.

In addition, the configuration of the present embodiment may be implemented when a CPU having the performance monitoring counter function is utilized without especially adding or modifying the hardware, so the present embodiment is widely applicable.

Note that in the above embodiment, switching of a process executed on the processor is determined on the basis of "TLB entry invalidation"; however, it is not limited. For example, when the performance monitoring counter is able to count a parameter that indicates the timing of start or end of a process, of course, switching of a process may be determined on the basis of that other parameter.

According to the disclosed technology as described above, it is possible to provide a technology for accurately and efficiently monitoring operation information of each program (process) executed in a CPU that has a paging system virtual memory, without any special modification at the side of an operating system.

Note that in a computer that constitutes the performance monitoring device, a program that executes the above described steps may be provided as a performance monitoring program. The above described program is executable on a computer that constitutes the performance monitoring device when stored in a computer-readable recording medium. Here, the above computer-readable recording medium includes an internal storage, such as a ROM and a RAM, that is installed in the computer, a portable recording medium, such as a CD-ROM, a flexible disk, a DVD disk, a magneto-optical disk and an IC card, a database that holds a computer program, and another computer and its database.

Thus, the steps in the above described performance monitoring method may be implemented by executing the performance monitoring program on the computer.

The invention is described in detail with specific embodiments, and it is obvious to the person skilled in the art that the specific embodiments can be variously modified or improved without departing the spirit and scope of the invention.

What is claimed is:

1. A non-transitory computer-readable recording medium storing therein a performance monitoring program containing instructions to be executed on a computer, the program causing the computer to execute:
   an interrupt detection procedure of detecting generation of an interrupt process to be executed by a processor in accordance with TLB entry invalidation executed in an operating system;
   a counter value acquisition procedure of acquiring a counter value of a predetermined event counted by the processor at a timing at which the interrupt process is detected in the interrupt detection procedure;
   a process information acquisition procedure of acquiring identification information for identifying a process executed on the processor from the operating system immediately before the interrupt process is detected in the interrupt detection procedure; and
   an associating procedure of associating the counter value acquired at the time of the interrupt process in the counter value acquisition procedure with the identification information acquired in the process information acquisition procedure in regard to the process that has been executed on the processor immediately before the interrupt process; wherein
   the associating procedure includes accumulating the counter value acquired in the counter value acquisition procedure for each process corresponding to the information acquired in the process information acquisition procedure; and
   the associating procedure further includes adding the counter value acquired in the counter value acquisition procedure to a counter value that is stored in a memory and is corresponding to the identification information acquired at the time when a previous interrupt process is generated.

2. The non-transitory computer-readable recording medium according to claim 1, the program further causing the computer to execute:
   a specifying information acquisition procedure of acquiring specifying information for specifying a monitoring target process,
   wherein the counter value acquisition procedure acquires a counter value of the predetermined event counted only with respect to a process corresponding to the specifying information acquired in the specifying information acquisition procedure on the basis of the identification information acquired in the process information acquisition procedure.

3. The non-transitory computer-readable recording medium according to claim 1, wherein
   the counter value acquisition procedure and the process information acquisition procedure respectively acquire the counter value and information regarding a process at predetermined intervals.

4. The non-transitory computer-readable recording medium according to claim 1, the program further causing the computer to execute:
   a switch determination procedure of determining whether a process corresponding to the information acquired in the process information acquisition procedure is different between before and after the interrupt process detected in the interrupt detection procedure,
   wherein the process information acquisition procedure acquires information regarding the process that will be executed immediately after the interrupt process when it is determined in the switch determination procedure that the process is different between before and after the interrupt process.

5. A performance monitoring method executed on a computer, comprising:
   an interrupt detection procedure of detecting generation of an interrupt process to be executed by a processor in accordance with TLB entry invalidation executed in an operating system;
   a counter value acquisition procedure of acquiring a counter value of a predetermined event counted by the processor at a timing at which the interrupt process is detected in the interrupt detection procedure;
   a process information acquisition procedure of acquiring identification information for identifying a process executed on the processor from the operating system immediately before the interrupt process is detected in the interrupt detection procedure; and an associating procedure of associating the counter value acquired at the time of the interrupt process in the counter value acquisition procedure with the identification information acquired in the process information acquisition procedure immediately before the interrupt process; wherein the associating procedure includes accumulating the counter value acquired in the counter value acquisition procedure for each process corresponding to the to the information acquired in the process information acquisition procedure, and the associating procedure further includes adding the counter value acquired in the counter value acquisition procedure to a counter value that is stored in a memory and is corresponding to the identification information acquired at the time when a previous interrupt process is generated.

6. The performance monitoring method according to claim 5, further comprising:

a specifying information acquisition procedure of acquiring specifying information for specifying a monitoring target process, wherein the counter value acquisition procedure acquires a counter value of the predetermined event counted only with respect to a process corresponding to the specifying information acquired in the specifying information acquisition procedure on the basis of the identification information acquired in the process information acquisition procedure.

7. The performance monitoring method according to claim 5, wherein the counter value acquisition procedure and the process information acquisition procedure respectively acquire the counter value and information regarding a process at predetermined intervals.

8. The performance monitoring method according to claim 5, further comprising:

a switch determination procedure of determining whether a process corresponding to the information acquired in the process information acquisition procedure is different between before and after the interrupt process detected in the interrupt detection procedure, wherein the process information acquisition procedure acquires information regarding the process that will be executed immediately after the interrupt process when it is determined in the switch determination procedure that the process is different between before and after the interrupt process.

9. A performance monitoring device comprising: an interrupt detection unit that detects generation of an interrupt process to be executed by a processor in accordance with TLB entry invalidation executed in an operating system;

a counter value acquisition unit that acquires a counter value of a predetermined event counted by the processor at a timing at which the interrupt process is detected by the interrupt detection unit;

a process information acquisition unit that acquires identification information for identifying a process executed on the processor from the operating system immediately before the interrupt process is detected by the interrupt detection unit; and an associating unit that associates the counter value acquired at the time of the interrupt process by the counter value acquisition unit with the identification information acquired by the process information acquisition unit immediately before the interrupt process; wherein the associating unit accumulates the counter value acquired in the counter value acquisition procedure for each process corresponding to the information acquired in the process information acquisition procedure storing in a memory: and the associating unit further includes adding the counter value acquired in the counter value acquisition unit to a counter value that is stored in a memory and is corresponding to the identification information acquired at the time when a previous interrupt process is generated.

10. The performance monitoring device according to claim 9, further comprising:

a specifying information acquisition unit that acquires specifying information for specifying a monitoring target process, wherein the counter value acquisition unit acquires a counter value of the predetermined event counted only with respect to a process corresponding to the specifying information acquired by the specifying information acquisition unit on the basis of the identification information acquired by the process information acquisition unit.

11. The performance monitoring device according to claim 9, wherein the counter value acquisition unit and the process information acquisition unit respectively acquire the counter value and information regarding a process at predetermined intervals.

12. The performance monitoring device according to claim 9, further comprising:

a switch determination unit that determines whether a process corresponding to the information acquired by the process information acquisition unit is different between before and after the interrupt process detected by the interrupt detection unit, wherein the process information acquisition unit acquires information regarding the process that will be executed immediately after the interrupt process when the switch determination unit determines that the process is different between before and after the interrupt process.

* * * * *